United States Patent [19]

Lajoie

[11] Patent Number: 6,075,227

[45] Date of Patent: Jun. 13, 2000

[54] TAPER LOCK CONTACT TIP AND HEAD ASSEMBLY FOR WELDING DEVICE

[75] Inventor: Robert M Lajoie, Windsor, Canada

[73] Assignee: Tregaskiss Ltd., Oldcastle, Canada

[21] Appl. No.: 09/153,755

[22] Filed: Sep. 15, 1998

[51] Int. Cl.[7] .................................................. B23K 9/24
[52] U.S. Cl. ...................................................... 219/137.61
[58] Field of Search ............................. 219/137.61, 136, 219/137.2, 137.31

[56] References Cited

U.S. PATENT DOCUMENTS

| | | |
|---|---|---|
| 2,761,049 | 8/1956 | McElrath et al. . |
| 3,007,033 | 10/1961 | Newman et al. . |
| 3,469,070 | 9/1969 | Bernard et al. . |
| 4,282,419 | 8/1981 | Auer . |
| 5,338,917 | 8/1994 | Stuart et al. . |
| 5,726,420 | 3/1998 | Lajoie . |
| 5,760,373 | 6/1998 | Colling ...................... 219/137.61 |

*Primary Examiner*—Clifford C. Shaw
*Attorney, Agent, or Firm*—Fildes & Outland, P.C.

[57] ABSTRACT

A contact tip for use with a welding gun includes a tapered portion, a threaded portion, an extension portion and a gripping feature. The tip is elongated and has a first end and a second end. The tip also has a wire feed axis extending therethrough and an axial wire feed aperture extending therethrough. The tapered portion of the tip is at a second end of the tip and has a frustoconical shape. The threaded portion of the tip includes double threads and is adjacent the tapered portion. The extension portion of the tip is adjacent the threaded portion and extends to the first end of the tip. The gripping feature is disposed on the extension portion. The tapered portion serves as a retaining feature. The double threads provide additional thread length while allowing the tip to be quickly unthreaded for quick tip changes in use.

6 Claims, 2 Drawing Sheets

TAPER LOCK CONTACT TIP AND HEAD ASSEMBLY FOR WELDING DEVICE

FIELD OF THE INVENTION

This invention relates generally to welding guns, and more particularly to a connection between a welding gun tip and a retaining member.

BACKGROUND OF THE INVENTION

Metal inert gas (MIG) welding equipment for welding one metal workpiece to another metal workpiece is well known in the welding art. A welding gun is designed to allow a user or robot to direct a metal welding wire toward a specific location on a target metal workpiece. The welding wire is fed through the welding gun, and ultimately through an orifice in the welding tip at the end of a welding gun. The welding wire, when energized for welding, carries a high electrical potential. When the welding wire makes contact with the target metal workpiece, an electrical circuit is completed and current flows through the welding wire, across the metal workpiece and to ground. The current causes the welding wire and the parent metal of the workpieces in contact with the welding wire to melt, thereby joining the workpieces. The extreme heat causes the welding tip, usually a copper alloy, to wear out relatively quickly.

Welding tips are commonly substantially cylindrical in shape from the front of the tip to the rear of the tip. The welding tips typically have screw threads for attaching to the welding gun. Known welding tips generally have a relatively short useful life because of the material deterioration caused by the extreme heat of the welding process. Furthermore, many known welding tips tend to loosen up from their connection to the welding gun when in use, forcing users to stop welding in order to replace or tighten the welding tip.

The desire to have a welding tip that demonstrates an improved and extended useful life and a more secure method of attachment to the welding gun has been described in my U.S. Pat. No. 5,726,420. The present invention improves the rapidity of tip change while increasing thread length.

SUMMARY OF THE INVENTION

A contact tip for use with a welding gun includes a tapered portion, a threaded portion, an extension portion and a gripping feature. The tip is elongated and has a first end and a second end. The tip also has a wire feed axis extending therethrough and an axial wire feed aperture extending therethrough. The tapered portion of the tip is at a second end of the tip and has a frustoconical shape. The threaded portion of the tip is adjacent the tapered portion. The extension portion of the tip is adjacent the threaded portion and extends to the first end of the tip. The gripping feature is disposed on the extension portion. The tapered portion serves as a retaining feature.

A combination of a contact tip and a welding gun includes the tip and the tip retaining member. The tip has a tapered portion, a threaded portion, an extension portion and a gripping feature. The tip retaining member has a wire feed aperture extending therethrough and is engaged by the tip. The tip has a first end and a second end, and a wire feed axis extending therethrough. The tip also has a wire feed aperture passing axially therethrough. A tapered portion of the tip is disposed at the second and has a frustoconical shape. A threaded portion of the tip is adjacent the tapered portion. The threaded portion comprises double threads. An extension portion is disposed at the first end. A gripping feature is disposed on the extension portion. The tip retaining member has an end and a wire feed aperture aligned with the wire feed aperture of the tip. The aperture at the end of the tip retaining member receives the second end of the tip. The tip retaining member has internal double threads engaged by the threads of the tip and has a tapered seat complementary in shape to the tapered portion which is engaged by the tapered portion of the tip. When the tip is subjected to rotational torque in a tightening direction, the tip will resist removal from the tip retaining member because of locking engagement between the tapered portion and the seat.

The disclosed welding tip, in combination with a tip retaining member provide a welding tip having an improved and extended useful life, and which also provides a more secure method of retention of the tip within the tip retaining member.

These and other features and advantages of the invention will be more fully understood from the following detailed description of the invention taken together with the accompanying drawings.

DETAILED DESCRIPTION OF THE INVENTION

Figure 1:
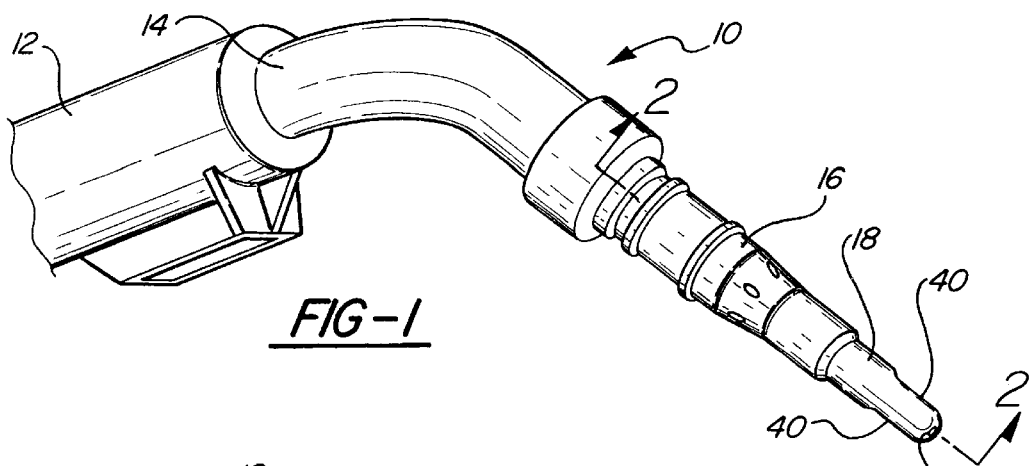
FIG. 1 is a perspective view of a hand-held welding gun showing the inventive tip and a nozzle.

A hand held welding gun 10 shown in FIG. 1 includes a handle 12, a goose neck 14, a retaining head nozzle or tip retaining member 16, and a contact tip 18. An interface between contact tip 18 and retaining head nozzle 16 has been configured to improve the retention of tip 18 by nozzle 16 and to facilitate quick removal of tip 18 from nozzle 16.

Figure 2:
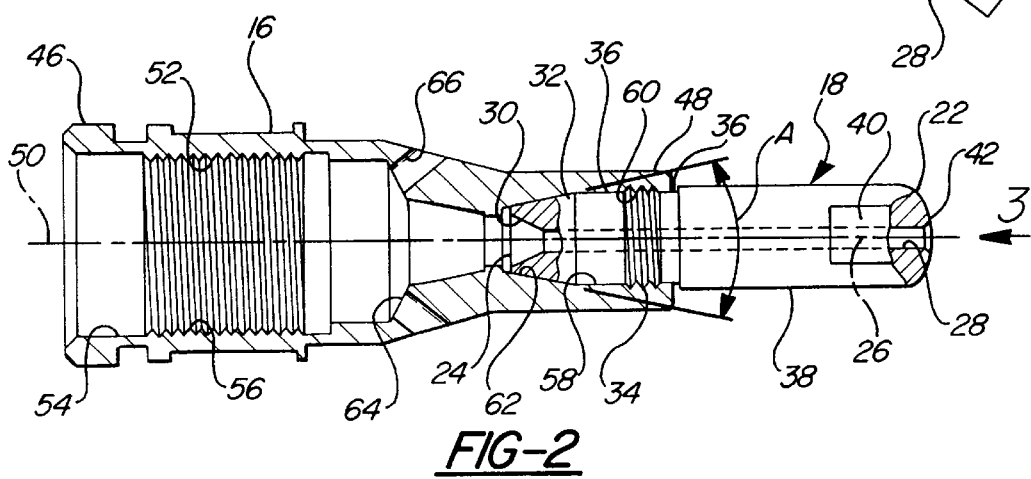
FIG. 2 is a cross-sectional side view of a first embodiment of the inventive tip and nozzle.

Tip 18 as shown in FIG. 2 is elongated in shape and has a first end 22 and an oppositely disposed second end 24. A tip axis 26 passes through first end 22 and second end 24 at the center of a wire feed aperture 28 passing through tip 18. Aperture 28 has a tapered receiving end 30 at the second end 24 of tip 18 to facilitate receiving wire being passed through tip 18.

A tapered portion 32 of tip 18 is disposed at second end 24. An included angle of A of tapered portion 32 is approximately 20°.

A threaded portion 34 is disposed on tip 18 adjacent tapered portion 32. Threaded portion 34 comprises double threads having an axial length greater than 3 times a pitch of the double threads. This relatively long thread length vis-a-vis conventional tip threads aids retention of the tip while the double threads facilitate quick removal of tip 18 from nozzle 16. The double threads of the threaded portion requires half the number of turns for tip removal as conventional tips making the tip desirable for robotic welding applications. A clearance diameter portion 36 is provided on both sides of threaded portion 34.

Figure 3:
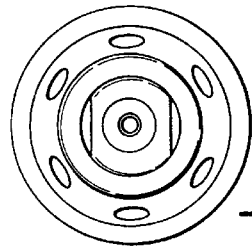
FIG. 3 is an end view of the tip and nozzle of FIG. 2 in the direction of arrow 3 in FIG. 2.

An extension portion 38 slightly larger in diameter than clearance portion 36 extends from the first end 22 to the nearest clearance portion 36. Extension portion 38 can assume any one of several embodiments, including a cylindrical form and a hex shaped cross-sectional form. The extension portion includes a gripping feature 40. Gripping feature 40 as shown in FIGS. 1–3 comprises a pair of parallel flats at the first end of tip 18. Alternatively, gripping feature 40 could be provided by using a hexagonally shaped extension portion with three pairs of opposed flats. Flats 40 are merely exemplary gripping features. Other shapes requiring tools other than an open end wrench may be employed as a gripping feature. Additionally, tip 18 has a chamfer 42 on first end 22.

Retaining head nozzle 16 has a first end 46 and a second end 48 with a longitudinal axis 50 passing therethrough. Longitudinal axis 50 is coincident with tip axis 26. An axial aperture 52 extends along axis 15 in alignment with wire feed aperture 28. A first diameter portion 54 of axial aperture 52 is disposed at first end 46 and has internal threads 56 disposed therein. A second diameter portion 58 of aperture 52 is disposed at second end 48 and is smaller in diameter than first diameter portion 54. Second diameter portion 58 has internal threads 60 disposed therein.

A tapered seat 62 in second diameter portion 58 is complementary in shape to tapered portion 32. Included angle A is selected to provide a locking effect when tip 18 is subjected to a torque in a tightening direction in retaining head nozzle 16.

Nozzle 16 includes a transition region 64 in axial aperture 52 between first diameter portion 54 and second diameter portion 58. Gas ports 66 pass from transition region 64 to outside of nozzle 16 and are oriented so that inert gas passing from inside the nozzle through the ports 66 displaces air around first end 22 of contact tip 18.

Figure 5:
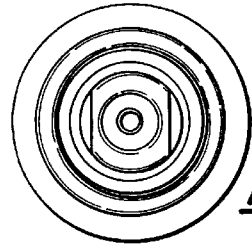
FIG. 5 is an end view of the nozzle and tip of FIG. 4 in the direction of arrow 5 of FIG. 4.
Figure 4:
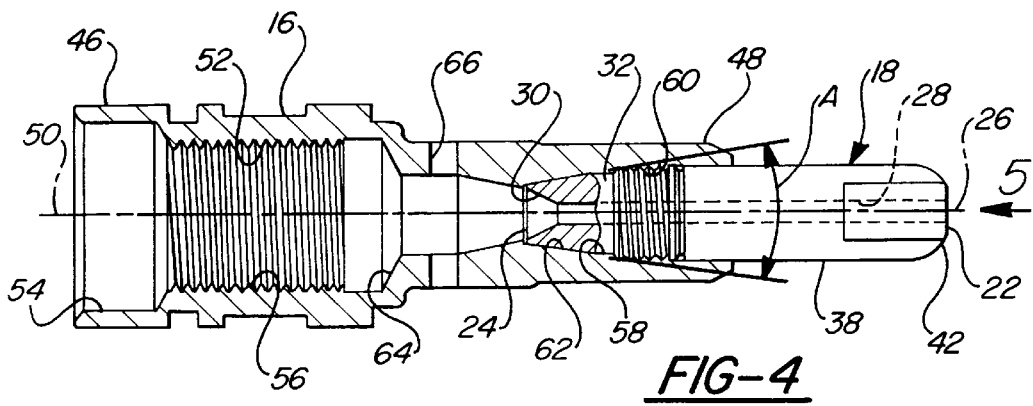
FIG. 4 is a sectional side view of a second embodiment of the nozzle and tip.

FIGS. 4 and 5 both show an alternative embodiment of the invention in which included angle A is appreciably less than that of the first embodiment, resultantly creating a much greater resistance to unintentional loosening of the tip, thereby making removal of tip 18 much more difficult.

Figure 6:
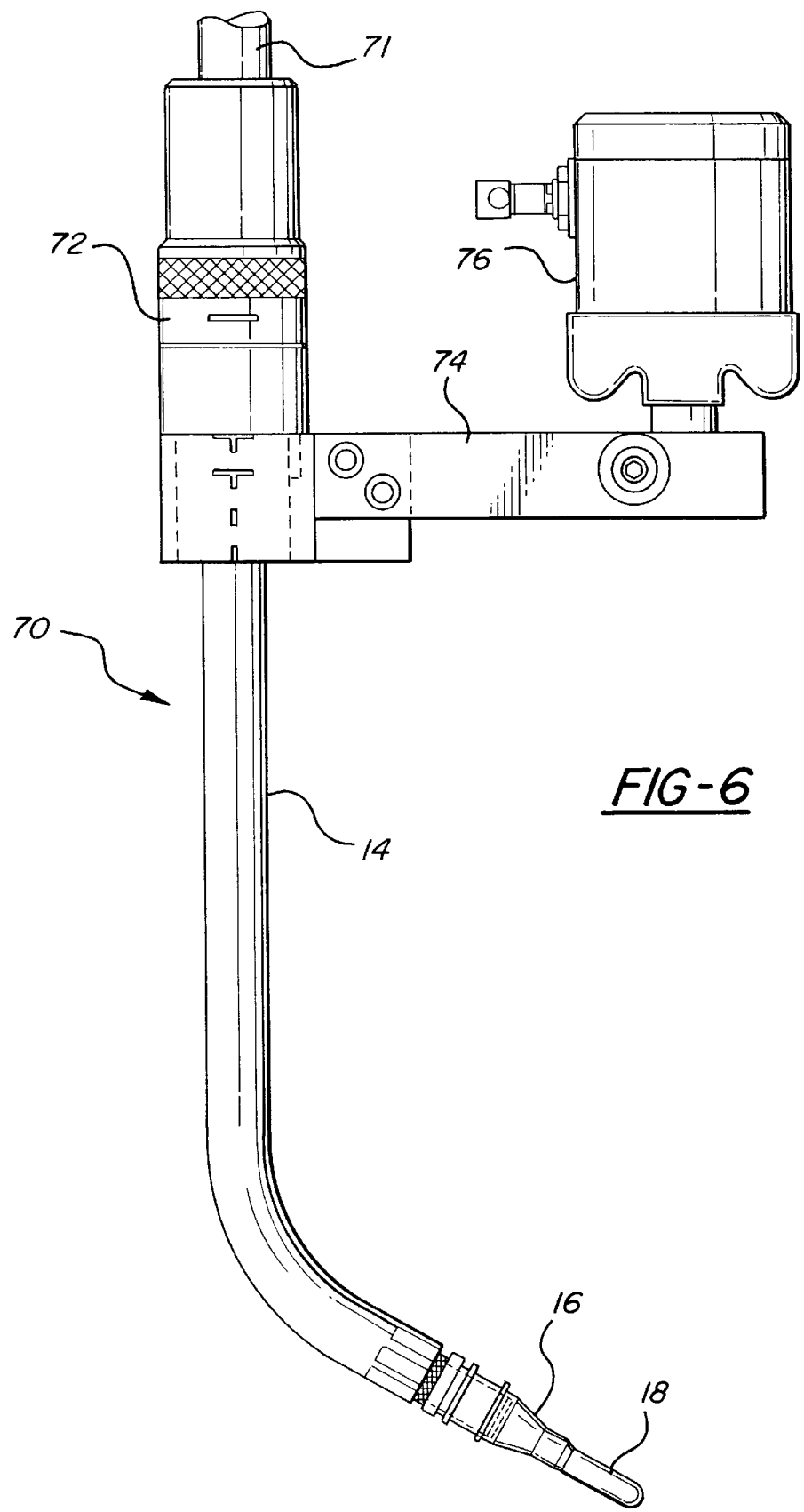
FIG. 6 is a side view of a robotic gun assembly.

FIG. 6 shows a robotic welding gun 70 with a welding cable 71 attaching to a connector 72. Connector 72 is received by arm 74 in a predetermined rotative position. Arm 74 is in turn connected to a safety mount or clutch 76 rigidly fixed to a robot arm (not shown).

Tip 18 and nozzle 16 are used in the following manner. Internal threads 56 in first diameter portion 54 of nozzle 16 thread over a threaded sleeve at an end of goose neck 14 or 78. Tip 18 has threaded portion 34 threaded into internal threads 60 of nozzle 16 until tapered portion 32 engages seat 62. Having clearance portions 36 between threaded portion 34 and extension portion 38 facilitates obtaining a clamping engagement between tapered portion 32 and nozzle 16 by preventing engagement of extension portion 38 against nozzle 16. The axial force induced by the threads responsive to a torque applied between tip 18 and nozzle 16 wedges tapered portion 32 into seat 62, developing a frictional load between tip 18 and nozzle 16 which resists relative movement between the two parts. The double threads of tip 18 allow for its quick removal and replacement. More conventional tips employing a large number of threads to achieve the desired clamping load necessary to retain the tip take longer to remove and install by comparison. The use of the tapered engagement between tip 18 and nozzle 16 enables the use of relatively few engagement threads on tip 18 while developing a sufficient amount of retention force between the parts to keep them engaged. The tapered engagement also provides a large contact area between tip 18 and nozzle 16 facilitating the rapid conduction of heat away from tip 18. Welding wire from gooseneck 14 or 78 passes through apertures 52 and 28. Entry of the welding wire into aperture 28 is aided by transition region 64 and tapered receiving end 30.

The embodiment of FIGS. 4 and 5 are essentially the same as that of FIGS. 2 and 3, except that the much smaller included angle A of FIGS. 4 and 5 results in a much higher level of clamping load between the two parts being generated.

Although the invention has been described by reference to certain specific embodiments, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A contact tip for use with a welding gun, the tip comprising:

the tip being elongated in shape and including a first end and a second end having a wire feed axis extending therethrough, and including a wire feed aperture axially passing therethrough;

a tapered portion at the second end of the tip having a frustoconical shape;

a threaded portion of the tip adjacent the tapered portion; said threaded portion comprising double threads; and an extension portion of the tip adjacent the threaded portion and extending to the first end;

wherein the tapered portion serves as a retaining feature and the threaded portion has an axial length greater than 3 times a pitch of the double threads enabling the tip to be quickly unthreaded while providing increased thread length.

2. A welding gun contact tip as claimed in claim 1 wherein the included angle of the tapered portion is not more that approximately 20°.

3. A welding gun contact tip as claimed in claim 1 including a gripping feature having at least one flat surface.

4. A combination of a retaining head nozzle and a welding gun, the combination comprising:

a tip including a first end and a second end having a wire feed axis extending therethrough, and including a wire feed aperture axially passing therethrough, a tapered portion at the second end of the tip having a frustoconical shape;

a threaded portion of the tip adjacent the tapered portion, said threaded portion comprising double threads;

an extension portion disposed at the first end; and a tip retaining member having an end and having a wire feed aperture aligned with the wire feed aperture of the tip, the wire feed aperture at the end of the tip retaining member receiving the second end of the tip and having internal double threads engaged by the threaded portion of the tip and a tapered seat engaged by and complementary in shape to the tapered portion of the tip, wherein, when the tip is subjected to torque in a tightening direction, the tip will resist removal from the tip retaining member because of locking engagement between the tapered portion and the seat, but the threaded portion has an axial length greater than 3 times a pitch of the double threads enabling the tip to be quickly unthreaded while providing increased thread length.

5. A combination of a contact tip and a tip retaining member as claimed in claim 4 wherein the included angle of the tapered portion and the seat is not more than approximately 20°.

6. A combination of a contact tip and a tip retaining member as claimed in claim 4 including a gripping feature having at least one flat surface.

* * * * *